Jan. 16, 1968 R. E. LAWRENCE 3,363,591

SECTIONALIZED EXPANSIBLE INSULATED SMOKESTACK AND BREECHING

Filed Jan. 30, 1967 5 Sheets-Sheet 1

INVENTOR
Richard E. Lawrence
Polachek & Saulsbury
ATTORNEYS

Jan. 16, 1968  R. E. LAWRENCE  3,363,591
SECTIONALIZED EXPANSIBLE INSULATED SMOKESTACK AND BREECHING
Filed Jan. 30, 1967  5 Sheets-Sheet 2
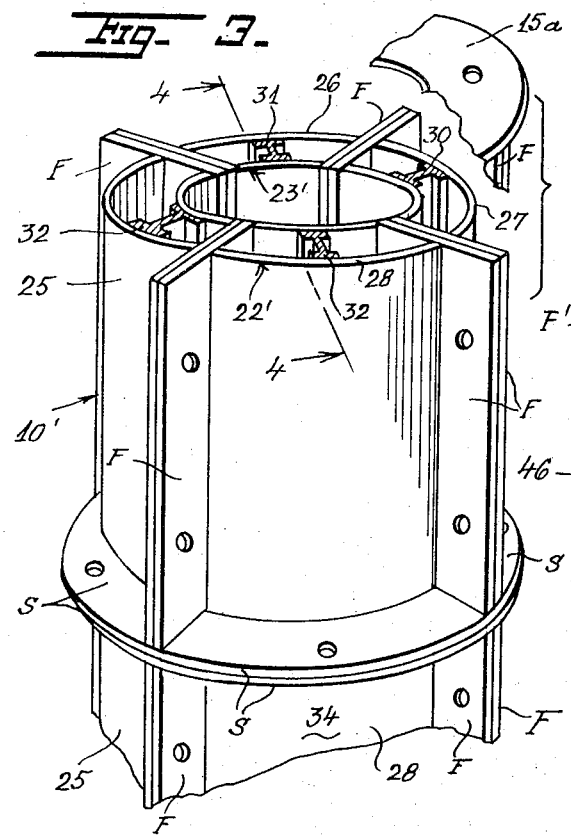
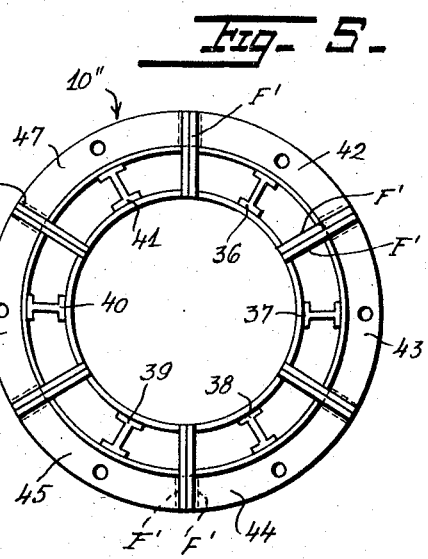
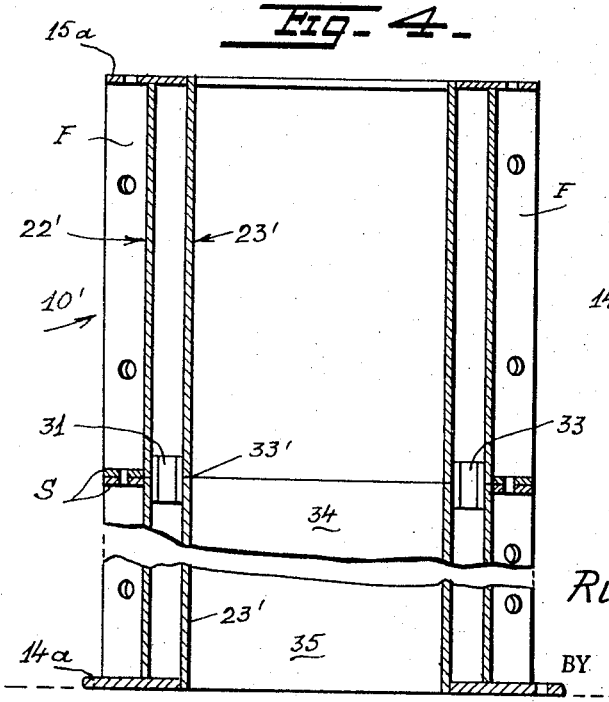
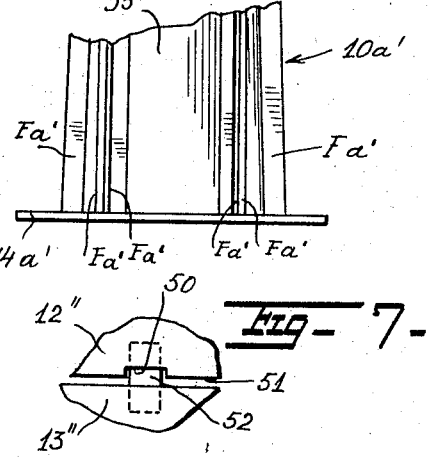
INVENTOR
Richard E. Lawrence
BY Polachek & Saulsbury
ATTORNEYS Jan. 16, 1968 R. E. LAWRENCE 3,363,591
SECTIONALIZED EXPANSIBLE INSULATED SMOKESTACK AND BREECHING
Filed Jan. 30, 1967
5 Sheets-Sheet 3
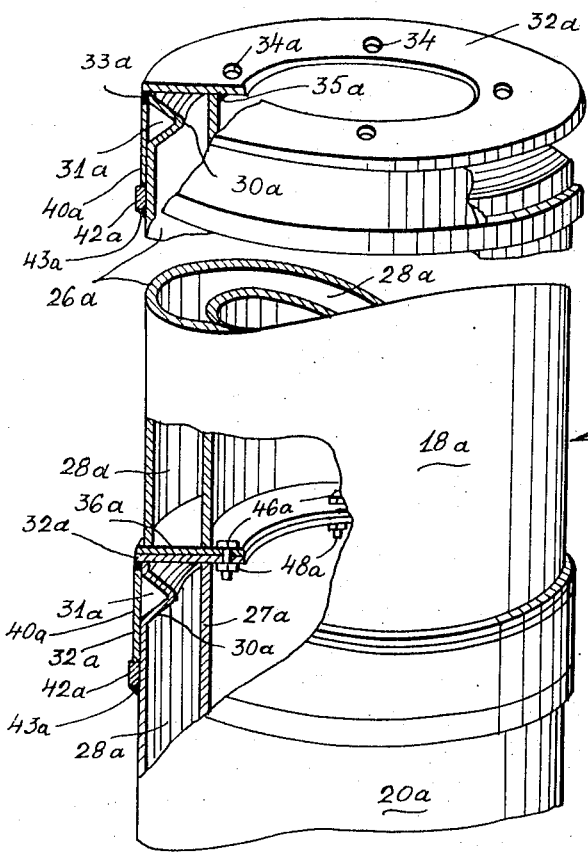
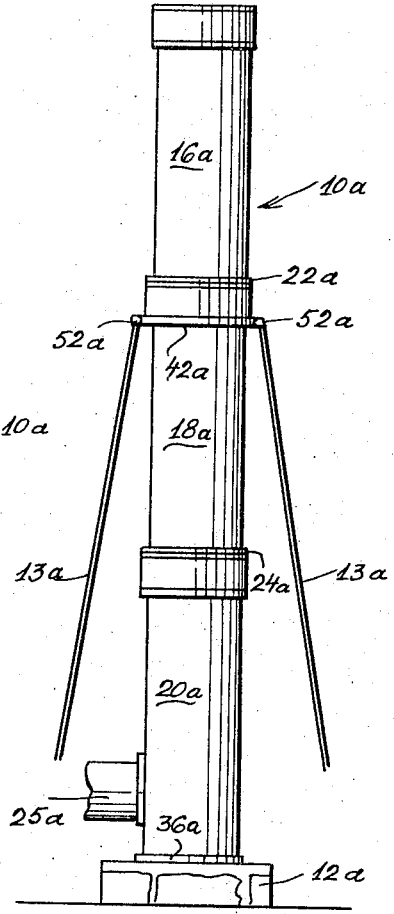
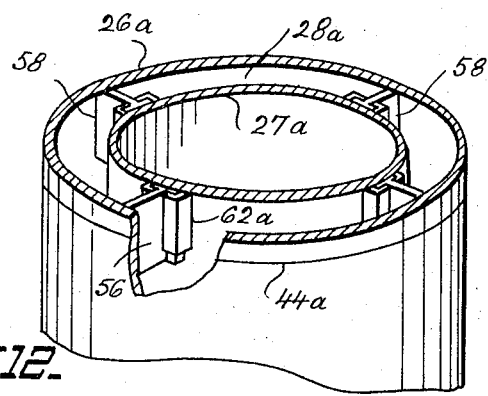
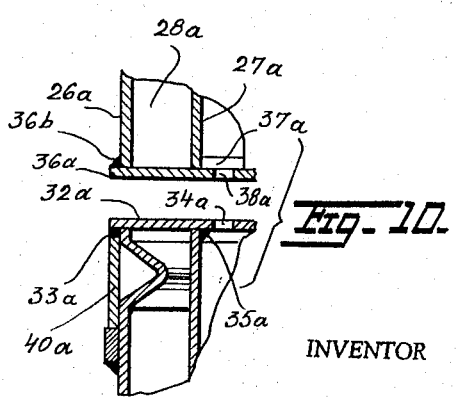
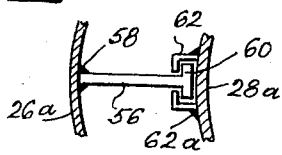
INVENTOR
Richard E. Lawrence
BY
Polachek & Saulsbury
ATTORNEYS

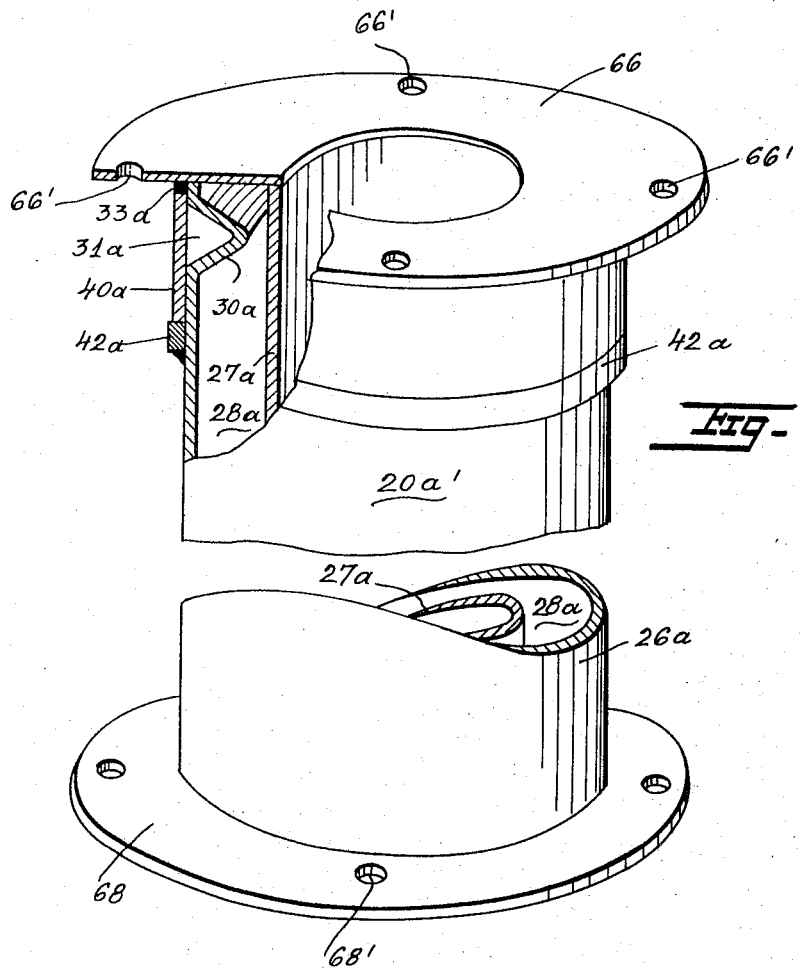
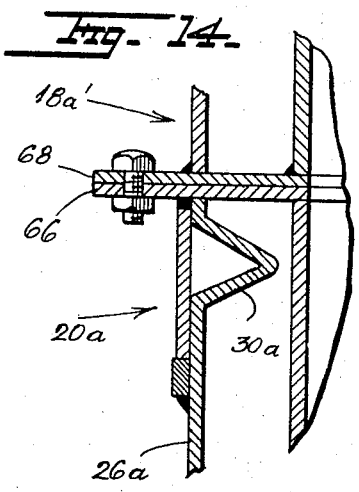
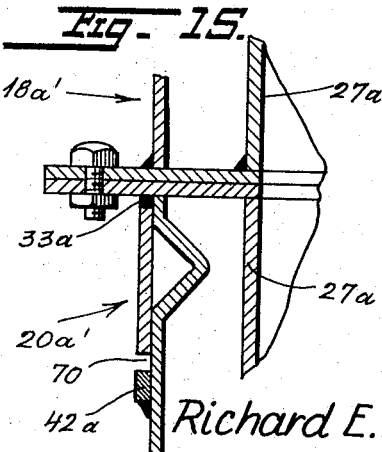

Jan. 16, 1968   R. E. LAWRENCE   3,363,591
SECTIONALIZED EXPANSIBLE INSULATED SMOKESTACK AND BREECHING
Filed Jan. 30, 1967   5 Sheets-Sheet 5
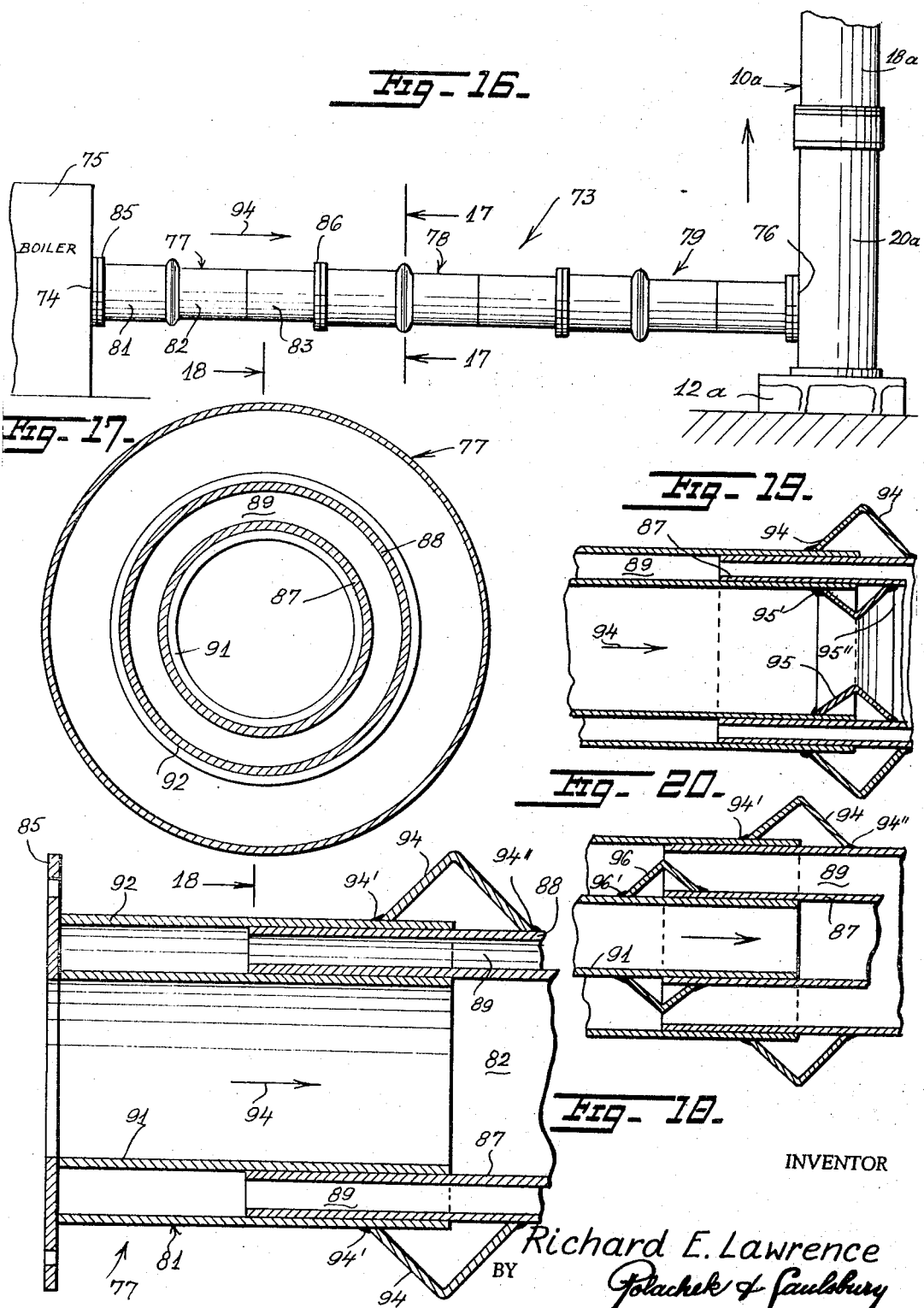
INVENTOR
Richard E. Lawrence
BY Polachek & Saulsbury
ATTORNEYS United States Patent Office 3,363,591
Patented Jan. 16, 1968

3,363,591
SECTIONALIZED EXPANSIBLE INSULATED
SMOKESTACK AND BREECHING
Richard E. Lawrence, 50—25 71st St.,
Woodside, N.Y. 11377
Continuation-in-part of applications Ser. No. 462,555,
June 9, 1965, and Ser. No. 579,938, Sept. 16, 1966. This
application Jan. 30, 1967, Ser. No. 612,548
10 Claims. (Cl. 110—184)

ABSTRACT OF THE DISCLOSURE

A smokestack and breeching construction having an elongated sectional tubular body, each section having a plurality of tubular units welded together, each unit including outer and inner spaced concentrically spaced tubular members. The sections are disposed end to end and welded to each other at the joints, and annular flanges on the ends of the sections for attaching to adjacent sections. Expansion means is provided in certain of the forms of the invention with special combined joint stiffeners and spacing members to allow for the relative expansion of the tubular members.

---

This invention relates to a steel smokestack and breeching construction constructed to eliminate condensation which causes destructive corrosion of most steel stacks, and is a continuation-in-part of my copending applications Ser. Nos. 462,555, and 579,938, filed respectively on June 9, 1965, and Sept. 16, 1966.

Condensation occurs in steel smokestacks and breeching therefor because of the temperature differential between the hot gases flowing along the internal surface and the cooler ambient air. A liquid condensate having sulphurous components attacks the steel and causes structural failure.

The present structure substantially eliminates the formation of this corrosive condensate upon the internal surface of the smokestack by insulating the inner surface of the stack from the outer surface with a dead air space. In so doing, the quick reduction of temperature of the hot gases is prevented and flow hot and rapidly out of the stack. The insulation is provided by a hermetically airsealed, double wall structure which is fabricated in a novel manner without increasing the cost or weight of material and to accommodate for the difference in expansion between the inner and outer walls.

The principal object of this invention is to provide an insulated steel smokestack and breeching construction which will prevent the formation of corrosive condensate on the internal surface and reduce the corrosion.

Another object of the invention is to provide a double walled steel smokestack and breeching with means for permitting thermal expansion between the inner and outer tubular members in the direction of their length.

Still another object of this invention is to provide a double-walled steel stack and breeching construction which utilizes hermetically sealed air insulation between the interior and exterior surfaces of the stack that will be structurally reinforced at appropriate points throughout the height of the stack or length of the breeching.

A further object of this invention is to provide a double-walled steel smokestack and breeching construction which can be fabricated in sections and conveniently transported from the point of fabrication to the location where the smokestack or breeching is to be erected.

In the accompanying drawings:

FIG. 3 is a fragmentary perspective view of a modified form showing a vertically sectionalized smokestack with top flange broken away.

FIG. 4 is a longitudinal section through the lines 4—4 of FIG. 3.

FIG. 5 is a plan view of the modified form of the invention of FIG. 3, the top flange being removed.

FIG. 6 is a partial side elevational view thereof.

FIG. 7 is a side elevational view at the joint between two connected portions of the section before welding and on being assembled.

FIG. 8 is a side elevational view of a smokestack of a modified form of the invention mounted on a stone base and breeching.

FIG. 9 is an enlarged fragmentary top perspective of two of the sections of the smokestack of FIG. 8, parts being broken away.

FIG. 10 is an enlarged vertical disassembled sectional view of a joint between fragments of the two sections.

FIG. 11 is a cross-sectional and perspective view taken through a joint, where cylindrical portions making up the sections are welded together, and slide bracers disposed between the walls to hold them in spaced relationship while permitting expansion of one wall relative to the other.

FIG. 12 is a top plan view of one of the slide bracers.

FIG. 13 is a top fragmentary perspective view of still another modified stack section of exterior assembly.

FIG. 14 is a fragmentary vertical sectional view of the two joined sections thereof in unexpanded condition, and FIG. 15 is a similar view to FIG. 14 with the walls expanded.

FIG. 16 is a side elevational view of combined expansible and air seal breeching means between boiler and smokestack of a further form of the invention.

FIG. 17 is a transverse sectional view taken on line 17—17 of FIG. 16.

FIG. 18 is a longitudinal sectional view taken on line 18—18 of FIG. 17.

FIG. 19 is a similar view to FIG. 18 of a breeching showing a double air seal, and FIG. 20 is a similar view to FIG. 18 of a breeching showing a different air seal.

Figure 1:
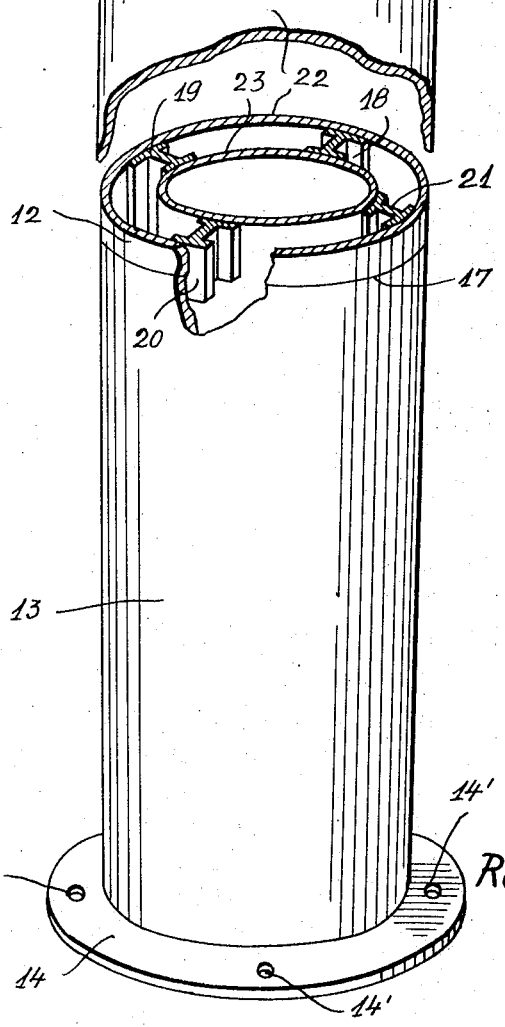
FIGURE 1 is a perspective view of a smokestack embodying the invention, parts being shown broken away.
Figure 1:
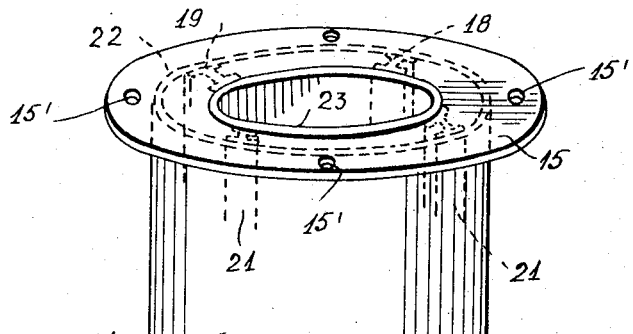
Figure 2:
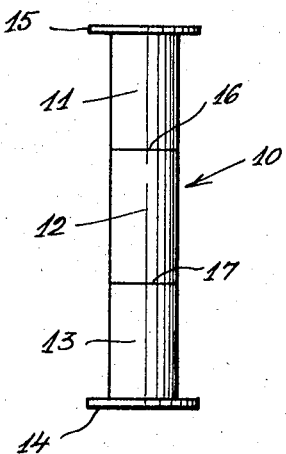
FIG. 2 is a side elevational view thereof without breakaway.

The general concept of this invention is illustrated in FIGS. 1 and 2, wherein there is shown a smokestack section 10 comprising three superposed hollow smokestack portions 11, 12 and 13, and bottom and top flanges 14 and 15, having bolt holes 14' and 15' respectively. The stack portions 11, 12 are welded together at joints 16 and 17, and flanges 14 and 15 are welded to the terminal portions 11 and 13 to form the typical smokestack section 10 adapted for field erection.

In FIG. 1, the internal details are shown at joint 17, I-beam joint stiffeners 18, 19, 20 and 21, located at 90° apart about the stack. These stiffeners reinforce the outer wall 22 and the inner wall 23 at the joint and can run at any length above and below to prevent radial collapse therebetween and assist in centering the inner wall 23 concentrically within the outer wall 22 during fabrication of the section 10. It is to be noted that the stiffeners are located across the joint 17, the joint serving as a center line therefor. The flanges 14 and 15 are welded to both the inner and outer walls 23, 22, and are used to bolt connect successive smokestack sections in order to build up a smokestack to a predetermined height.

FIGS. 3 and 4 show a modified smokestack section 10′ for stacks of larger diameter, wherein the stack sections are fabricated in quarter circle sectional portions, and then assembled together in the field.

An inner wall 23′ of smokestack 10′ extends slightly beyond the outer wall 22′ at both ends, FIG. 4 so that the flanges 14a and 15a will fit axially over the projecting ends of the inner wall 23′ snugly, thereby encompassing all of the quarter sections and providing additional rigidity to the welded connection, whereas the flanges 14a and 15a abut only the ends of outer wall 22′.

In FIGS. 3 and 4, a top cylindrical section 10′ is formed from four segmental portions 25, 26, 27 and 28, each having pairs of longitudinally and radially-extended edge flanges F along the long vertical edges thereof, with spaced holes for bolting together in the field to erect smokestacks. Each of the said segmental portions form a quarter of a cylindrical section 10′ and together inner cylindrical smoke wall 23′ concentrically spaced from an outer wall 27 by stiffeners 30, 31, 32 and 33, also at intervals midway with respect to the flanges F whereby an external flange joint occurs at 45° spacing from each of the stiffeners. The flanges F function as a slide means for joining the segmental portions in place over one another in the field to form a full cylindrical smokestack, and as vertical stiffeners of any length for the entire structure. A double wall providing dead air space is built up from four segmental portions which can be effectively nested and shipped conveniently, and then assembled in the field by bolts at a distant location. Transverse annular flange stiffeners S surround the ends of outer wall 23′ and contain the quarter portions at joints 33′ for interconnecting in the field quarter portions of the stack such as 34 and 35 by bolts or the like.

In FIG. 5, smokestack section 10″ is shown provided with six stiffeners 36, 37, 38, 39, 40 and 41, at 60° intervals about the center of the stack, and occur across the center line of the transverse joints connecting the portions of the stack, as previously described. A cylindrical stack section 10″ is formed from six segmental portions 42, 43, 44, 45, 46 and 47, having longitudinally and radially extending flanges F′ used both to assemble the portions in the field and to function as vertical stiffeners to resist bending and compressive stresses. For stacks of large diameters which extend to a relatively higher elevation, stack sections 10a′ are preferably tapered, as shown in FIG. 6, because the stresses at the base sections are much greater than those at the higher sections. The lower section 35 is shown with flanges Fa′ and a bottom base 14a′.

Wherein two adjacent cylindrical portions 12″ and 13″ are welded together, a stronger connection is afforded as shown in FIG. 7, wherein the upper section 12″ is recessed at 50 along its bottom edge 51, exposing a portion of I-beam stiffener 52 between the edges of the upper section 12″ and of lower sections 13″ for the reception of welding material therein as the portions are brought together. The welding material contacts the stiffener along a greater area to provide a better welding connection.

In FIGS. 9 to 17, a smokestack 10a is mounted on stone base 12a and held by stay wires 13a that can be anchored to the ground.

This smokestack is made up of three steel expansible double-walled sections 16a, 18a and 20a, joined to one another at 22a and 24a. A breeching 25a extends from the bottom section 20a, thereby providing a smokestack adapted for easy field erection from prefabricated double-walled sections.

Each of the sections 16a, 18a and 20a comprises an expansible outer wall 26a and an inner wall 27a concentrically-spaced therefrom to provide a dead air space 28a therebetween. At the top end of the section, FIGS. 8 and 9, outer wall 26a is bent into a circumferential accordion-like fold 30a extending inwardly thereof providing a collapsed groove 31a thereabout. An annular plate 32a is welded to the top edge of the fold 30a at 33a, serving to connect the top of one section to the bottom of the section thereabove and to the inner wall 27a at 35a. Holes 34a are struck in the annular plate 32a adjacent to its inner periphery. At the bottom end, another annular plate 36a having similar holes 38a is welded at 36′ and 37a to the bottom edges of the respective outer and inner walls 26a and 27a. In use, inner wall 27a expands from the heat of the hot gases flowing out of the stack while the outer wall 26a being relatively cold and sometimes of thinner metal, will through differential thermal expansion between the walls be permitted to expand axially because of the accordion-like fold 30a thereof.

A metal apron 40a surrounds the outer wall 26a, encircling the groove 31a to cover it and is welded at its top edge to the under surface of the top annular plate 32a at an outer wall 26a at 33a. This apron is not attached to the outer wall below the groove and can be lifted with the outer wall along the outer surface thereof. Another narrower metal stop band 42a is welded at 43a to the outer wall 26a below its lower edge to limit the downward movement of apron 40a. The fold 40a of the outer wall permits outer wall 26a to expand with inner wall 27a. Each stack section is as described in the first form made up of several less length portions welded as at 44a.

In mounting the smokestack 10a, the bottom plate 36a of one section is superimposed on the top annular plate 32a of the section below and bolts 46a in aligned holes 34a and 38a of the plates as secured by nuts 48a. The bottom section 20a will have been secured by stay bolts, not shown, embedded in the top surfaces of the base 12a. The stay wires 13a are fixed to perforated lugs 52a at annular stop band 42a of a stack section.

To accommodate relative expansion of the outer and inner walls 26a and 27a by T-section vertical brace or stiffener 56 is welded at 58 across to portion welded at 48 to the inner surface of the outer wall 26a and its crosshead 60 slidably fitted into an elongated split socket 62 welded to the outer surface of the inner wall 27a at 62a, FIGS. 9 and 10. These braces 56 while holding the stack walls 26a and 27a in concentric spaced relation permit vertical expansion of the walls relative to each other. The inner wall 27a may be similarly constructed from cylindrical portions and retained at their welded split socket pieces 62.

In FIGS. 13 to 15, in which the same numerals apply to like parts, sections 18a′ differ from sections 16a, 18a and 20a of the smokestack 10a in that outer peripheries of top annular plate top and bottom annular plates 66 and 68 both extend outwardly beyond the outer wall 26a, and the holes 66′ and 68′ instead of being in the inner peripheries of the plates are adjacent the outer peripheries thereof and the sections secured to each other by the bolts 46a′ and nuts 48a′ which are bolted from the exterior of the stack as when the stacks are of small diameter and would not allow for the lowering of a fabricator into the stack.

When the inner wall 27a is heated and elongated thereby, the accordion fold 30a will open as best shown in FIG. 15 and will accommodate the outer wall 26a for the expansion of the inner wall 27a and take with it the apron 40a which confines the shape of the upper end of the outer wall about fold 30a, the apron ring rising a distance 70 from stop band. An expansion fold may be made as well or separately in the inner wall 27a where the expansion thereof may be too great for the outer wall 26a to be accommodated by the accordion-like fold 30a.

In FIGS. 16 to 18, inclusive, an expansible breeching 73 connects the outlet 74 of boiler 75 with inlet 76 of smokestack 10a of FIG. 8 and is made up of a series of double-walled tubular expansible sections 77, 78, 79. Each section, includes three tubular portions 81, 82, 83, the portions 81 and 82 being slidably fitted to one another and the portions 82 and 83 both welded to one another. The sections themselves are connected to the boiler, to each other and to the stack by flanges 85 and 86. Each of the outer tubular portions 82 and 83 have similar diameter inner and outer tubular walls 87 and 88 concentrically spaced to provide dead space 89 therebetween and held so spaced by braces described if desired.

The portion 81 has an inner tubular member 91 slide fitted within the inner member 87 of the portion 82 and an outer member 92 slide fitted outside of the outer member 88 of the portion 82.

In order to seal the interior of the dead air space 89 and smoke flow at 93, a yieldable ring 94 of inverted V-shaped cross section is sleeved around the joint between the end of outer member 92 and outer member 88 of portion 82 and welded respectively thereto in an air tight manner at its opposite ends at 94′ and 94″. By reason of this yieldable ring 94, the joint between the adjacent ends of the portion 81 and 82 are sealed so that the products of combustion passing through the breeching cannot escape.

In use, the products of combustion pass from the boiler 75 to the smokestack 10a in the direction of the arrow 94 the inner wall members expand faster and since ring 94 can expand the outer wall member will be accommodated to the inner members. When sufficiently cooled, the rings 94 will retract the portions 82 and 83 into the portions 81.

In FIG. 19, in addition to the outer ring 94, an internal ring 95 is welded at 95′, 95″ between the ends of the inner tubular members 87 and 91 of the portion 82 and 81 thereby preventing positive escape of products of combustion into the insulating space 89 between the outer and inner tubular members.

In FIG. 20, a joint is shown which differs from the joints of FIG. 19 in that an expansion ring 96 connected between the inner tubular members 87 and 91 is of inverted U-section and is disposed in the dead air space 89′ between and welded air tight to the inner tubular members 91 and 87 and 96′ and 96″. The inner member may have less diameter to accommodate the rings 96.

It should be apparent now that a hermetically-sealed smokestack or breeching is provided wherein the gases flow hot internally for the height of the stack and not substantially reduced in temperature by the colder outer air. The corrosive sulphurous condensate is practically eliminated, resulting in longer life for the stack. The gases flow more rapidly and expel into the atmosphere in a lighter and more volatile condition, thereby reducing air pollution. The double wall with the sealed air pocket greatly reduces the danger of one being burned from the exterior wall. The temperature drop is kept to a minimum. The inner temperature can be 500° F. and the outer wall temperature 90° F. Furthermore, the exterior of the stack can be painted any color, and is not restricted to the colors used in heat resistant paints. Thus, the exterior can be more asthetically decorated, and lengthened from a normal two-year period to a five-year period. With the double wall construction being utilized, the cost of the material is not substantially increased because this double wall construction permits the use of lighter sheets of steel than used in single stack construction. The expansion means permits the higher temperature inner wall to expand relative to the cooler outer wall.

What is claimed is:

1. In a sectional smokestack or the like, an assembly of superposed smokestack sections, each of said sections having spaced concentric inner and outer walls, the inner wall defining a smoke conduit, said walls defining a hermetically-sealed dead air space therebetween, and terminal plate flanges attached to the ends of the sections and sealing off the dead air space at the ends thereof, each section further having axially aligned portions and connected rigidly by transverse abutted welded joints braced at uniformly spaced intervals about the joint by stiffeners within the dead air space, said stiffeners extending above and below the line of the welded joints, said terminal plate flanges having angularly-spaced holes and joining means extending through holes of the superposed sections to secure them together when the smokestack is being erected.

2. In a sectional smokestack or the like as defined in claim 1 wherein each section has a plurality of segmental sectional portions with axially and radially-extending flanges along the long edges thereof staggered with respect to the stiffeners, said terminal flanges joining together the portions by their inner members by contacting the outer surface of the inner walls of the sectional portions to retain the same in nested relationship, the inner concentric wall of the segmental portions extending slightly beyond the outer wall and the terminal flanges circumscribe and fit snugly against the outer surface of the inner wall and abut at right angles the end edge surfaces of the outer wall.

3. In a sectional smokestack as defined in claim 2, and transverse annular stiffeners at the transverse welded joints of the portions extending about the outer members of the segmental portions and the inner space to further stiffen the joint, said axially and radially-extending flanges extending axially between the terminal and transverse annular stiffeners.

4. In a sectional smokestack as defined in claim 1, and annular accordion-like fold expansion means in the dead air space on one of the tubular walls of each section to accommodate for the difference in axial thermal expansion between the outer and inner walls thereof.

5. In a smokestack or like as defined in claim 4, wherein the accordion fold expansion means includes an annular fold in one end of the outer wall of each section forming an external groove therein and adapted to be expanded, one of said terminal flanges being secured at its outer periphery to the folded end of the outer tubular wall, a ring apron depending from the plate and secured thereto around the groove in said outer wall, the outer wall being in slidable engagement with the ring apron.

6. A smokestack or the like as defined in claim 5, and a narrow stop band on the outer tubular wall of each section engageable by the lower edge of the ring apron for limiting downward movement thereof and the collapse of the accordion-like fold.

7. In a smokestack or the like as defined in claim 4, wherein the transverse joint stiffeners include T-section vertically-extending plates on the surface of one of the walls across the joint, and split tubular sockets on the surface of the other wall across the joint opposite the T-section plates and open at the top to slidably receive the T-head thereof.

8. In a smokestack or breeching as defined in claim 1, and certain of the aligned portions of a section having their respective inner and outer tubular wall members respectively slidably fitted together and an expansible-sealing ring of inverted V-section surrounding one of the sets of members and welded means joining its ends to the respective members of the set.

9. In a smokestack or breeching as defined in claim 8, and said inverted V-section sealing ring being connected exteriorly to the outer wall members and a further expansible V-section sealing ring being disposed inside the set of inner tubular members and weld means joining its ends to respective wall members of the inner set.

10. In a smokestack or breeching as defined in claim 8, and said inverted V-section sealing ring being connected exteriorly to the outer wall members and a further similar sealing ring being disposed in the dead air space axially offset from the exterior sealing ring and weld means joining its ends to the respective wall members of the inner set.

References Cited
UNITED STATES PATENTS

| | | | |
|---|---|---|---|
| 515,482 | 2/1894 | Richmond | 98—46 |
| 1,139,672 | 5/1915 | Gosline | 98—60 |
| 1,890,930 | 12/1932 | Blackmore | 98—60 |
| 1,949,984 | 3/1934 | Walker | 110—184 |
| 2,308,307 | 1/1943 | Robinson | 285—286 |
| 2,520,751 | 8/1950 | Zucrow | 285—226 |
| 3,302,599 | 2/1967 | Lawrence | 110—184 |

FOREIGN PATENTS

| | | |
|---|---|---|
| 577,328 | 5/1933 | Germany. |
| 942,002 | 11/1963 | Great Britain. |

FREDERICK L. MATTESON, JR., *Primary Examiner.*

H. B. RAMEY, *Assistant Examiner.*